United States Patent [19]

Idel et al.

[11] 4,381,359

[45] Apr. 26, 1983

[54] STABILIZED THERMOPLASTIC MOULDING COMPOSITIONS

[75] Inventors: Karsten Idel; Hans-Josef Buysch; Dieter Margotte, all of Krefeld; Horst Peters, Leverkusen, all of Fed. Rep. of Germany

[73] Assignee: Bayer Aktiengesellschaft, Leverkusen, Fed. Rep. of Germany

[21] Appl. No.: 302,797

[22] Filed: Sep. 16, 1981

Related U.S. Application Data

[63] Continuation of Ser. No. 169,305, Jul. 16, 1980, abandoned.

[30] Foreign Application Priority Data

Jul. 19, 1979 [DE] Fed. Rep. of Germany ....... 2929229

[51] Int. Cl.$^3$ ............................................... C08K 5/52
[52] U.S. Cl. ................................................... 524/117
[58] Field of Search ................. 260/45.7 PH; 524/117

[56] References Cited

U.S. PATENT DOCUMENTS

| | | | |
|---|---|---|---|
| 3,305,520 | 2/1967 | Fritz et al. .................... | 260/45.7 PH |
| 3,509,091 | 4/1970 | Cleveland et al. ............. | 260/45.8 R |
| 3,756,906 | 9/1973 | Leyland et al. ................ | 161/231 |
| 3,954,905 | 5/1976 | Margotte et al. .............. | 525/67 |
| 3,963,804 | 6/1976 | Yonemitsu et al. ........... | 260/45.7 PH |
| 4,066,611 | 1/1978 | Axelrod ........................ | 260/45.7 PH |
| 4,252,750 | 2/1981 | Buysch et al. ................. | 524/117 |

Primary Examiner—Veronica P. Hoke
Attorney, Agent, or Firm—Connolly and Hutz

[57] ABSTRACT

Stabilized thermoplastic moulding compositions comprising (1) from 10 to 90 parts by weight of a polycarbonate, based on aromatic dihydroxy compounds; and (2) from 90 to 10 parts by weight of a mixture of (2.1) from 25 to 100 parts by weight of a graft copolymer of a monomer mixture of styrene, methyl methacrylate or acrylonitrile polymerized on a rubber; of (2.2) from 0 to 20 parts by weight of a butadiene polymer having a butadiene content of at least 5 parts by weight; and (2.3) from 0 to 75 parts by weight of a copolymer of styrene, α-methyl styrene, methyl methacrylate, acrylonitrile or methacrylonitrile; containing 0.01 to 3.0% by weight, based on the whole stabilized mixture, of at least one ester of phosphorous acid and an ortho- or para-substituted phenol or bisphenol, and a process for their production.

2 Claims, No Drawings

STABILIZED THERMOPLASTIC MOULDING COMPOSITIONS

CROSS REFERENCE TO RELATED APPLICATIONS

This application is a continuation of application Ser. No. 169,305 filed July 16, 1980 and now abandoned.

This invention relates to the thermal stabilization of mixtures of aromatic polycarbonates and ABS plastics by means of from 0.01 to 3%, by weight, (based on the total mixture), of esters of phosphorous acid and ortho- and/or para-alkyl-substituted phenols or the corresponding bisphenols. "ABS-plastics" is used to describe known polymers, based on styrene (or derivatives), acrylonitrile (or derivatives), and a diene rubber. Commonly grafts of styrene and acrylonitrile onto polybutadiene (or similar rubber) are used.

Mixtures of ABS plastics and aromatic polycarbonates are known (German Pat. No. 1,170,141), as are also the corresponding three component mixtures containing styrene/acrylonitrile copolymers as the third component thereof (German Auslegeschrift No. 1,810,993). Mixtures of aromatic polycarbonates and certain ABS plastics have been described in German Pat. No. 2,259,656 and German Offenlegungsschrift Nos. 2,329,548 and 2,329,546.

When such mixtures are being processed, surface faults in the form of bubbles or streaks are liable to occur on exposure to temperatures of up to 300° C., especially when producing parts having large surface areas.

The present invention relates to mixtures of aromatic polycarbonates and ABS plastics containing from 0.01 to 3%, by weight, preferably from 0.05 to 2%, by weight, (based on the whole mixture), of one or more esters of phosphorous acid and ortho- and/or para-alkyl-substituted phenols or the corresponding bisphenols.

In particular, the present invention relates to a mixture comprising (1) from 10 to 90 parts, by weight, of an aromatic polycarbonate;

(2) from 90 to 10 parts by weight of a mixture of:

(2.1) from 25 to 100 parts by weight of a graft copolymer of a monomer mixture of styrene, methyl methacrylate or mixtures thereof as one constituent and acrylonitrile, methacrylonitrile or mixtures thereof as the other constituent, polymerised on a rubber;

(2.2) from 0 to 20 parts, by weight, of a butadiene polymer having a butadiene content of at least 5%, by weight;

(2.3) from 0 to 75 parts, by weight, of a copolymer of, on the one hand, styrene, α-methyl styrene or mixtures thereof and, on the other hand, methyl methacrylate, acrylonitrile, methacrylonitrile or mixtures thereof;

characterised in that they contain from 0.01 to to 3%, by weight, preferably from 0.05 to 2%, by weight, based on the whole mixture, of one or more esters of phosphorous acid and ortho- and/or para-alkyl-substituted phenols or bisphenols as stabilizers.

The present invention also relates to the use of esters of phosphorous acid and ortho- and/or para-alkyl-substituted phenols or the corresponding bisphenols in quantities of from 0.01 to 3%, by weight, preferably from 0.05 to 2%, by weight (based on the whole mixture) for the thermal stabilization of mixtures of aromatic polycarbonates and ABS plastics.

The thermostabilization according to the present invention not only improves the thermal characteristics, but also produces a better surface and improves the stability of the melt and the mechanical properties of the stabilized products.

Phosphorous acid esters which are suitable for the purposes of the present invention include those corresponding to the following general formula (I):

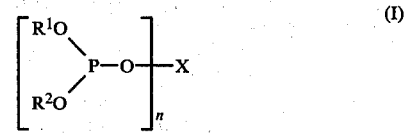

wherein

X represents hydrogen or an aromatic group having from 1 to 18 carbon atoms or an alkaryl or aralkyl group having from 7 to 24 carbon atoms which may also contain olefinic double bonds and hetero-atoms (preferably O, S, and non-basic nitrogen);

n represents an integer of from 1 to 4, preferably 1 or 2; according to the valency of X;

$R^1$ and $R^2$ independently represent $C_1$–$C_{18}$ alkyl, $C_5$–$C_{15}$ cycloalkyl, $C_7$–$C_{24}$ aralkyl or alkaryl or $C_6$–$C_{24}$ aryl; a linear or branched $C_1$–$C_9$ alkyl group or $C_5$–$C_7$ cycloalkyl group, which may be substituted with 3–6 linked cyclic groups, containing O and S as heteroatoms;

X can be linked with $R^1$ or $R^2$ and represents the same as $R^1$ and $R^2$.

Also suitable are phosphorous acid esters corresponding to the following general formula II:

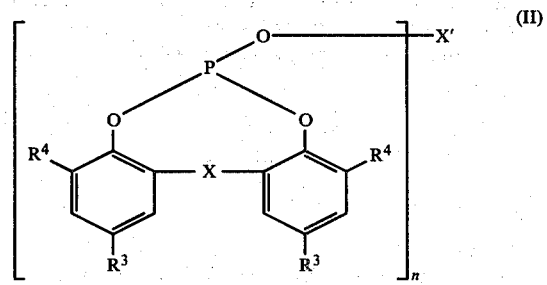

wherein

X' is X or a substituted or unsubstituted aliphatic or cycloaliphatic radical;

n is, as defined above;

$R^3$ and $R^4$, which may be the same or different, represent $C_1$–$C_9$ aliphatic groups, $C_5$ or $C_6$ cycloaliphatic groups, $C_7$–$C_9$ aralkyl groups or $C_6$–$C_{10}$ aryl groups; and Y represents S or $HCR^5$ wherein $R^5$ represents H, $C_1$–$C_6$ alkyl, cyclohexenyl or cyclohexyl.

Preferred substituents for X are: OH, $C_1$–$C_4$ alkoxy, SH, $C_1$–$C_4$ alkylmercapto, $C_1$–$C_{12}$ alkyl, $C_5$ or $C_6$ cycloalkyl, $C_7$–$C_{12}$ aralkyl, $C_6$–$C_{10}$ aroxy or $C_6$–$C_{10}$ aryl.

X preferably represents hydrogen or a group corresponding to the following general formula (III):

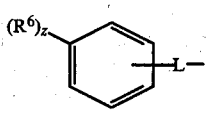

wherein
R⁶ represents hydrogen, L, aryl, a condensed ring, a C₁-C₉ alkyl group, a C₇-C₁₂ alkylaryl group, a C₁-C₄ alkyl-mercapto group, a C₁-C₄ alkoxy group, a β-hydroxy alkoxy group, an OH group or an amino-SH group or a group corresponding to the following general formula:

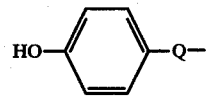

wherein Q represents a single bond, O, S, O—(CH₂-)₂—O or C₁-C₄ alkylidene, and
z represents 1 or 2, and
L represents a single bond or an alkylenoxy group or a group corresponding to the following general formula (IV):

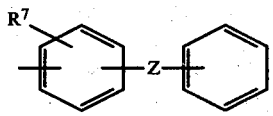

wherein
R⁷ represents OH or H;
Z represents a single bond, a C₁-C₄ alkylidene group, O, S or O—(CH₂)₂—O or a mono- or di-valent C₁-C₁₈ alkyl group which is substituted by phenyl, OH or phenoxy and may be attached through ether bridges or S-bridges, or it represents a C₁-C₉ alkyl-cyclohexyl or tetra-allyl group or a group corresponding the the following general formula (V):

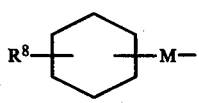

wherein
R⁸ represents H, M, a hydroxyalkyl group, a hyroxyalkoxy group, an alkylene group, H, OH or a bond; and
M represents an alkylene or alkylene-cycloalkyl group;
X may also represent:

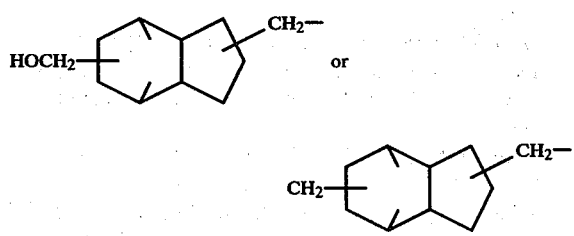

or oxyalkylation products of glycerol, trimethylol-propane or pentaerythritol containing from 3 to 8 oxyethyl or oxypropyl groups.

Stabilizers (I) wherein X represents H and R¹ and R² represent aromatic groups, preferably substituted with C₁-C₉ alkyl groups in the o- and/or p-position to the ester bond, and phosphites (II) are preferred.

It is particularly preferred to use compounds (II) wherein
X represents H,
R³ represents a C₁-C₉ alkyl group, a C₅ or C₆ cycloalkyl group, a C₇-C₉ aralkyl group or a C₆-C₁₀ aryl group;
R⁴ represents a benzyl, α-methylbenzyl, α,α-dimethylbenzyl, methyl, ethyl, isopropyl, tertiary butyl, tertiary amyl, isononyl, cyclopentyl or cyclohexyl group, and
Y represents.

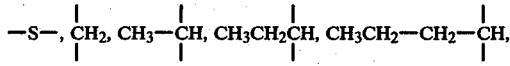

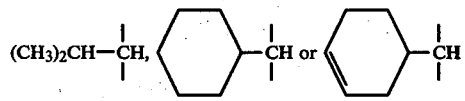

Various thermoplastic polycarbonates may be used for the moulding compositions according to the present invention.

By the term "aromatic polycarbonates" is meant, in the context of the present invention homo- and co-polycarbonates based, for example, in one or more of the following diphenols:

hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α-bis-(hydroxyphenyl)-diisopropyl benzenes, and the corresponding compounds which are alkylated and/or halogenated in the nucleus. These and other suitable diphenols have been described in, for example, U.S. Pat. Nos. 3,028,365; 2,999,835; 3,148,172; 3,275,601; 2,991,273; 3,271,367, 3,062,781 and 2,999,846; German Offenlegungsschrift Nos. 1,570,703; 2,063,050; 2,063,052; 2,211,956 and 2,211,957; French Pat. No. 1,561,518; and the monograph entitled "H. Schnell, Chemistry and Physics of Polycarbonates, Interscience Publishers, New York, 1964."

The following are examples of preferred diphenols:
4,4'-dihydroxydiphenyl; 2,2-bis-(4-hydroxyphenyl)-propane; 2,4-bis-(4-hydroxyphenyl-2-methyl butane; 1,1-bis-(4-hydroxyphenyl)-cyclohexane; α,α'-bis-(4-hydroxyphenyl)-p-diisopropyl benzene; 2,2-bis-(3-methyl-4-hydroxyphenyl)-propane; 2,2-bis-(3-chloro-4-hydroxyphenyl)-propane; bis-(3,5-dimethyl-4-hydroxyphenyl)-methane; 2,2-bis-(3,5-dimethyl-4-hydroxyphenyl)-propane; bis-(3,5-dimethyl-4-hydroxyphenyl)-sulphone; 2,4-bis-(3,5-dimethyl-4-hyroxyphenyl)-2-methyl butane; 1,1-bis-(3,5-dimethyl-4-hydroxyphenyl)-cyclohexane; α,α'-bis-(3,5-dimethyl-4-hydroxyphenyl)-p-diisopropyl benzene; 2,2-bis-(3,5-dichloro-4-hydroxyphenyl)-propane and 2,2-bis-(3,5-dibromo-4-hydroxyphenyl)-propane.

The following are examples of particularly preferred diphenols:
2,2-bis-(4-hydroxyphenyl)-propane; 2,2-bis-(3,5-dimethyl-4-hydroxyphenyl)-propane; 2,2-bis-(3,5-dichloro-4-hydroxyphenyl)-propane; 2,2-bis-(3,5-dibromo-4- hydroxyphenyl)-propane and 1,1-bis-(4-hydroxyphenyl)-cyclohexane.

Preferred aromatic polycarbonates are those based on one or more of the preferred diphenols mentioned above. It is particularly preferred to use copolycarbonates based on 2,2-bis-(4-hydroxyphenyl)-propane and one of the other diphenols mentioned above as being particularly preferred. Polycarbonates based solely on 2,2-bis-(4-hydroxyphenyl)-propane or 2,2-bis-(3,5-dimethyl-4-hydroxyphenol)-propane are also particularly preferred.

The aromatic polycarbonates may be prepared by known methods, e.g. by a solvent-free ester interchange from bisphenol and diphenyl carbonate or from bisphenols and phosgene in solution. The solution may be homogeneous ("pyridine process") or heterogeneous ("disphasic interface process"). Polycarbonates which have been prepared in solution, especially those prepared by the diphasic interface process, are particularly suitable.

The aromatic polycarbonates may be branched as a result of the incorporation of small quantities, preferably from 0.05 to 2.0 mol percent, (based on the quantity of diphenols put into the process), of trifunctional or higher than trifunctional compounds, e.g. compounds having 3 or more phenolic hydroxyl groups.

Polycarbonates of this type have been described, for example, in German Offenlegungsschrift Nos. 1,570,533; 1,595,762,2,116,974; 2,113,347 and 2,500,092; British Pat. No. 1,079,821; and U.S. Pat. No. 3,544,514.

Examples of suitable compounds having 3 or more than 3 phenolic hydroxyl groups include: phloroglucinol; 4,6-dimethyl-2,4,6-tri-(4-hydroxyphenyl)-heptene-2; 4,6-dimethyl-2,4,6-tri-(4-hyroxyphenyl)-heptane; 1,3,5-tri-(4-hydroxyphenyl)benzene; 1,1,1-tri-(4-hydroxyphenyl)-ethane; tri-(4-hydroxyphenyl)-phenyl methane; 2,2-bis-[4,4-bis-(4-hydroxyphenyl)-cyclohexyl]-propane; 2,4-bis-(4-hydroxyphenyl-isopropyl)-phenol; 2,6-bis-(2'-hydroxy-5'-methyl-benzyl)-4-methylphenol; 2-(4-hydroxyphenyl)-2-(2,4-dihydroxyphenyl)-propane and 1,4-bis-(4,4"-dihydroxytriphenyl-methyl)-benzene. Other tri-functional compounds include: 2,4-dihyroxybenzoic acid, trimesic acid, cyanuric chloride and 3,3-bis-(4-hydroxyphenyl)-2-oxo-2,3-dihydroindole.

The aromatic polycarbonates should generally have average molecular weights, determined as the weight average $\overline{M}_w$, of from 10,000 to above 200,000, preferably from 20,000 to 80,000, (determined by measuring the relative viscosities in $CH_2Cl_2$ at 25° C. at a concentration of 0.5%, by weight).

Where polycarbonate mixtures are used, small proportions of low molecular weight polycarbonates, e.g. having an average degree of polymerisation of from 2 to 20, may be added to the high molecular weight polycarbonates having $\overline{M}_w$, values of from 10,000 to 200,000.

Another component of the moulding compositions is a graft polymer (2.1) in which a monomer mixture of from 95 to 50% by weight, of styrene, methylmethacrylate or mixtures thereof and from 5 to 50% by weight, of acrylonitrile, methylmethacrylate or mixtures thereof has been graft polymerised on a rubber. Suitable rubbers include, in particular, polybutadiene, butadiene/styrene copolymers containing up to 30%, by weight, of styrene incorporated by polymerisation, copolymers of butadiene and acrylonitrile containing up to 20%, by weight, of acrylonitrile, or copolymers of butadiene containing up to 20%, by weight, of a low alkyl ester of acrylic or methacrylic acid(e.g. methyl acrylate, ethyl acrylate, methyl methacrylate and ethyl methacrylate). Various components which have an elasticizing effect could in principle be used, provided they have a rubbery elastic character.

In addition to the graft polymer, the moulding composition may also contain a butadiene polymer (2.2).

The butadiene polymers contained in the moulding compositions are preferably copolymers of from 5 to 95%, by weight, of butadiene and from 70 to 5%, by weight, of styrene, acrylonitrile, acrylic acid, methacrylic acid, $C_1-C_6$ alkyl esters of acrylic or methacrylic acids (most preferably methyl methacrylate), divinyl benzene or mixtures of these comonomers. The following are particularly suitable: copolymers of from 70 to 90%, by weight, of butadiene and from 30 to 10%, by weight, of styrene, copolymers of from 60 to 95%, by weight, of butadiene and from 40 to 5%, by weight, of methyl methacrylate; copolymers of from 30 to 95%, by weight, of butadiene and from 70 to 5%, by weight, of butyl acrylate; and copolymers of from 60 to 80%, by weight, of butadiene and from 40 to 20%, by weight, of acrylonitrile. The last-mentioned copolymers may also contain minor quantities (up to a total of about 10%) of methacrylic acid and/or divinyl benzene incorporated by polymerisation. Examples of tertiary and quaternary polymers of the last-mentioned type include copolymers of 63% butadiene, 34% of acrylonitrile and 3% of methacrylic acid; and copolymers of 60%, by weight, of butadiene, 36%, by weight, of acrylonitrile, 3% of methacrylic acid and 1% of divinyl benzene.

The moulding composition may, in addition to the graft copolymer, contain a copolymer (2.3) of the graft monomers or similar monomers. These are copolymers of from 95 to 50%, by weight, of styrene, α-methyl styrene, methyl methacrylate or mixtures thereof and from 5 to 50%, by weight, of acrylonitrile, methacrylonitrile, methyl methacrylate or mixtures thereof. Such copolymers are frequently formed as by-products of graft polymerisation, particularly when large quantities of monomers are grafted on small quantities of rubber. Separately-prepared copolymers of this type may also be added in addition to or instead of the copolymers formed in this manner.

The moulding compositions according to the present invention may be obtained by mixing the components. According to a preferred preparation, the latices of graft polymer (2.1) and optionally also those of butadiene polymer (2.2) and of copolymer (2.3) are first mixed and the solid substances are precipitated together and dried. The resulting pulverulent mixture is then mixed with the polycarbonate. Alternatively, the components of the moulding compositions according to the present invention may be prepared separately and subsequently mixed in known mixing apparatus, such as mixing rollers, extruder screws or internal mixers.

Incorporation of the stabilizers according to the invention may be carried out by the known techniques. For example, kneaders or screw extruders may be used to incorporate the stabilizers into the individual components before they are used to prepare the mixture, or the same apparatus may be used to incorporate the stabilizers directly at the stage when the individual components are being worked-up thermoplastically to prepare the whole mixture, or the stabilizers may be subsequently incorporated in the whole mixture.

The moulding compositions according to the present invention are either prepared from components already containing additives, such as stabilizers, flame retarding agents, pigments, fluidizing agents, lubricants, mould release agents or antistatic agents, or these additives may be added while the individual components are being mixed.

The present moulding compositions may be used for the production of various types of moulded bodies, in particular injection moulded bodies. Examples of moulded products which may be prepared from these moulding compositions include housing parts of various types, e.g. for domestic appliances, such as juice extractors, coffee machines or mixers, or cover plates used in the building industry or parts for the motor vehicle industry. They are also used in the field of electro technology on account of the very advantageous electrical properties thereof. They may also be used for the production of moulded bodies by deep drawing previously-produced plates or foils.

EXAMPLE 1

Phosphorous acid ester of phenol and 2,6-di-tertiary butyl-p-cresol:

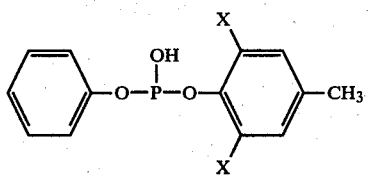

(1)

197 g (0.64 mol) of triphenyl phosphite and 11.5 g (0.64 mol) of water are maintained at 80° C. for ca. 1 hour. 2,6-di-tertiary butyl-p-cresol is then added and phenol (125 g) is distilled off through a small distillation column at a sump temperature of from 110° to 180° C. and at from 40 to 10. Compound (1) is obtained as a faintly yellow oil (207 g).

EXAMPLE 2

Phosphorous acid ester of phenol and bis-(2-hydroxy-3-styryl-5-methyl-phenyl)-methane:

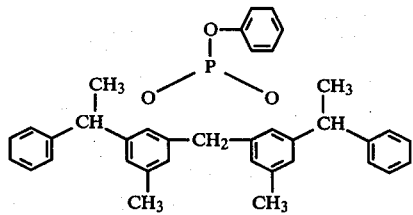

(2)

A mixture of 218 g (0.5 mol) of bis-(2-hydroxy-3-styryl-5-methylphenyl)-methane and 155 g (0.5 mol) of triphenyl phosphite is heated with stirring at from 170° to 250° C. and from 16 to 18 Torr for 8 hours. 94 g (1 mol) of phenol distill off. 276 g of compound (2) are obtained as a pale yellow melt which solidifies to a brittle mass.

| $C_{37}H_{35}PO_3$ (558.66) | % C calculated | 79.55 | observed | 79.09 |
|---|---|---|---|---|
| | H | 6.32 | | 6.57 |
| | P | 5.54 | | 5.12 |

EXAMPLE 3

Phosphorous acid ester of phenol and bis-(2-hydroxy-3-benzyl-5-methyl):

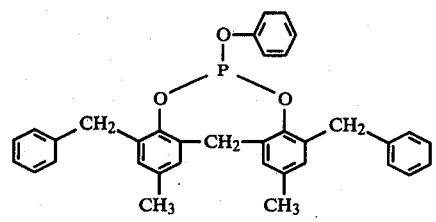

(3)

A mixture of 204 g (0.5 mol) of bis-(2-hydroxy-3-benzyl-5-methyl-phenyl)-methane and 155 g of triphenyl phosphite is heated to from 160° to 230° C. at 14 Torr for 6 hours. A total of 92 g of phenol distills off. 263 g of compound (3) is obtained as a yellowish resin.

EXAMPLE 4

Phosphorous acid ester of bis-(2-hydroxy-3-cyclohexyl-5-methyl-phenyl)-methane and 1 mol of octaethylene glycol:

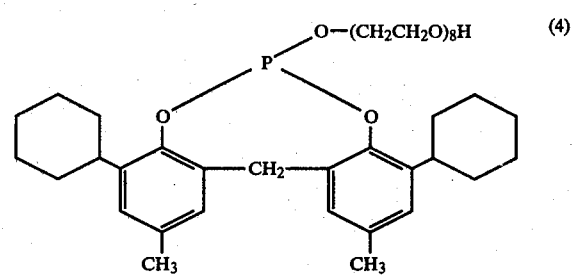

(4)

A mixture of 514 g (1 mol) of the phosphorous acid ester of Example 1 and 370 g (1 mol) of octaethylene glycol is heated to from 200° to 250° C. at 20 Torr for 2.5 hours. 90 g of phenol distill off. The reaction product obtained is a yellow resin (790 g) of formula (4).

EXAMPLE 5

Phosphorous acid ester of bis-(2-hydroxy-3-cyclohexyl-5-methyl-phenyl)-methane:

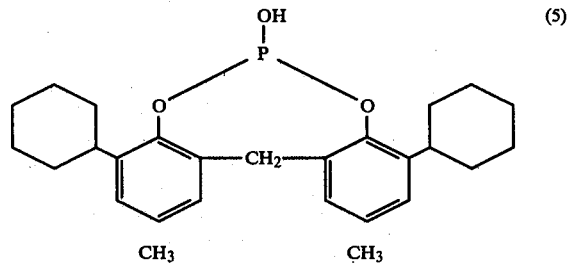

(5)

A mixture of 392 g (1 mol) of bis-2-(hydroxy-3-cyclohexyl-5-methyl-phenyl)-methane, 310 g (1 mol) of triphenyl phosphite and 18 g (1 mol) of water is heated to 180° C. under nitrogen at normal pressure. The mixture is left to cool to 100° C. and then heated from 100° C. to 200° C. in 2.5 hours at 25 Torr. 270 g of phenol distill over in the process. An almost colourless, slowly crystalline product (450 g) is obtained as residue. Melting point: 180°–181° C. (from xylene), molecular weight: 403 (calculated 438).

| C27H35PO3 | C calculated | 76.23 | observed | 76.61 |
|---|---|---|---|---|
| | H | | 8.50 | 8.43 |
| | P | | 7.06 | 7.36 |

EXAMPLE 6

Phosphorous acid ester of bis-(2-hydroxy-3-benzyl-5-methylphenyl)-sulphide:

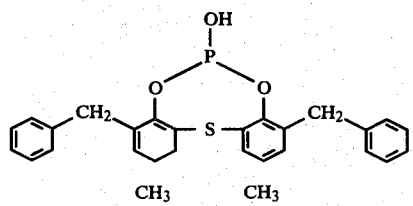
(6)

A mixture of 213 g of bis-(2-hydroxy-3-benzyl)-(5-methyl-phenyl)-sulphide (0.5 mol), 155 g (0.5 mol) of triphenyl phosphite and 9 g (0.5 mol) of H2O is first heated to 180° C. under nitrogen at normal pressure, then cooled to 100° C. and thereafter heated to 200° C. over a period of 2 hours at 25 Torr. 135 g of phenol distill over. The reaction product obtained (250 g) is a yellowish resin corresponding to formula (6)

EXAMPLE 7

Phosphorous acid ester of bis-(2-hydroxy-3-benzyl-5-methyl-phenyl)-methane:

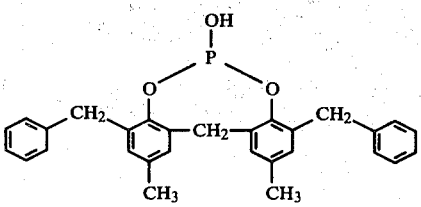
(7)

A mixture of 77.5 g (0.25 mol) of triphenyl phosphite, 4.5 g (0.25 mol) of H2O and 102 g (0.25 mol) of bis-(2-hydroxy-3-benzyl-5-methyl-phenyl)-methane is reacted as described in Example 7. 69 g of phenol are obtained as distillate and 118 g of compound (7) as a yellowish resin.

EXAMPLE 8

Phosphorous acid ester of bis-(2-hydroxy-3-cyclohexyl-5-methyl-phenyl)-sulphide:

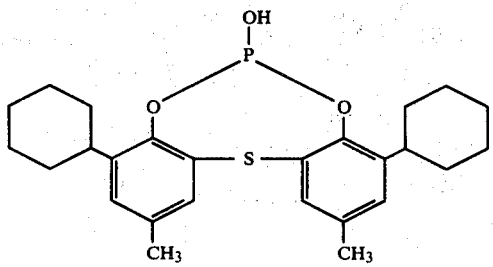
(8)

A mixture of 41 g (0.1 mol) of bis-(2-hydroxy-3-cyclohexyl-5-methyl-phenyl)-sulphide, 31 g (0.1 mol) of triphenyl phosphite and 1.8 g (0.1 mol) of H2O is heated to 180° C. under nitrogen with stirring, cooled to 100° C. and then heated from 100° C. to 250° C. over a period of 5 hours at from 12 to 13 Torr. 27 g of phenol distill over. The reaction product obtained as residue consists of 45 g of a solid, pale yellow resin. When crystallized from ligroin, crystals melting at 122° C. are obtained.

| C26H33PO3S (456.59) | % C Calculated | 68.35 | Observed | 68.13 |
|---|---|---|---|---|
| | H | 7.29 | | 7.52 |
| | P | 6.78 | | 6.43 |
| | S | 7.02 | | 7.28 |

EXAMPLE 9

Phosphorous acid ester of phenol and bis-(2-hydroxy-3-isononyl-5-methyl-phenyl)-methane:

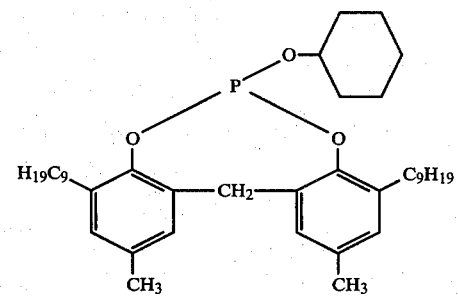
(9)

C9H19 = tripropyl

A mixture of 300 g (0.6 mol) of bis-(2-hydroxy-3-isononyl-5-methyl-phenyl)-methane and 186 g (0.6 mol) of triphenyl phosphite is heated to from 150° to 220° C. over a period of 8 hours at 12 ml in the presence of 0.5 g of LiOH. 115 g of phenol distill off. Compound (9) is obtained as residue in the form of a tough, yellowish resin.

The moulding compositions described in the following Examples were prepared in an internal kneader at 230° C. or a double shaft extruder at 260° C. by mixing the ABS polymer with the polycarbonate component and the particular stabilizer.

The properties of the moulding compositions were determined by the following methods:

1. Notched impact strength according to DIN 53 453 at room temperature. The test samples were prepared in injection moulding screws at the given mass temperatures.

2. Injection moulded sample plates (60×40×2 mm) were assessed optically on the basis of a scale of 1 to 7 where 1 denotes a flawless surface, 3–4 denote minor, but acceptable, surface faults and 7 denotes heavy streaks.

3. The intrinsic melt index (IMI) and the theoretical half life $t_h$ were determined under a 5 kg load according to DIN 53 735 at 260° C.

A polycarbonate based on bisphenol A having a relative solution viscosity $\eta rel = 1,290–1,300$ (0.5 g of polycarbonate in 100 ml of methylene chloride at 25° C.) and the following ABS polymers were used in these examples:

ABS POLYMER A (a) 60 parts, by weight, of a graft polymer prepared by grafting 35 parts, by weight, of styrene and 15 parts, by weight of acrylonitrile on 50 parts, by weight, of coarse particles of polybutadiene (by emulsion polymerisation according to German Auslegeschrift Nos. 1,247,665 and 1,269,360), the average particle diameter of the polybutadiene used as graft base, which is in the latex form, being from 0.3 to 0.4μ; and (b) 40 parts, by weight, of a styrene/acrylonitrile copolymer having a styrene:acrylonitrile ratio of 70:30 and an intrinsic viscosity $[\eta]=79.1$ (determined in dimethyl formamide at 20° C.).

ABS POLYMER B (a) 70 parts, by weight, of a graft polymer prepared by grafting 35 parts, by weight, of styrene and 15 parts, by weight, of acrylonitrile on 50 parts, by weight, of a finely divided polybutadiene having an average particle diameter of from 0.05 to 0.15μ; and (b) 30 parts, by weight, of a copolymer of styrene/acrylonitrile in proportions of 70:30 having an intrinsic viscosity of $[\eta]=80.9$.

EXAMPLES 10 TO 13

|  |  | Proportion in the whole mixture in parts, by weight | | | |
|---|---|---|---|---|---|
| Polycarbonate | | 45 | 45 | 45 | 45 |
| ABS polymer A | | 55 | 55 | 55 | 55 |
| Stabilizer from Example 5 | | — | 0.25 | — | 0.1 |
| Stabilizer from Example 8 | | — | — | 0.25 | 0.1 |
| Notched impact strength kJ/m² | | 13.7 | 33.1 | 30.5 | 31.7 |
| optical assessment after | 250° C. | 1 | 1 | 1 | 1 |
| injection moulding at the | 260° C. | 1 | 1 | 1 | 1 |
| given temperature: | 270° C. | 3 | 1 | 1 | 1 |
|  | 280° C. | 4 | 2 | 2 | 2 |

EXAMPLES 14 TO 22

| Polycarbonate | 60 | 60 | 60 | 60 | 60 | 60 |
|---|---|---|---|---|---|---|
| ABS polymer A | 40 | 40 | 40 | — | 40 | 40 |
| ABS polymer B | — | — | — | 40 | — | — |
| Stabilizer Example 5 | — | 0.1 | 0.25 | 0.25 | — | — |
| Stabilizer Example 1 | — | — | — | — | 0.25 | — |
| tris-nonyl-phosphite | — | — | — | — | — | 0.25 |
| tris-(3-hydroxymethyl-3-ethyl-oxetane)-phosphite | — | — | — | — | — | — |
| optical assessment | 270° | 2 | 1 | 1 | 1 | 1 | 1 |
| after injection | 280° | 4 | 1 | 1 | 1 | 1 | 1 |
| moulding at the | 290° | 5 | 2 | 1 | 2 | 2 | 3 |
| given temperature: | 300° | | 4 | 3 | 4 | 3 | 4 |
| Polycarbonate | 60 | 60 | 60 |
| ABS polymer A | 40 | — | 40 |
| ABS polymer B | — | 40 | — |
| Stabilizer Example 5 | — | — | — |
| Stabilizer Example 1 | — | — | — |
| tris-nonyl-phosphite | — | — | — |
| tris-(3-hydroxymethyl-3-ethyl-oxetane)-phosphite | 0.1 | 0.1 | 0.25 |
| optical assessment | 270° | 1 | 1 | 1 |
| after injection | 280° | 1 | 1 | 1 |
| moulding at the | 290° | 2 | 3 | 2 |
| given temperature: | 300° | 5 | 5 | 4 |

EXAMPLES 23 TO 26

| Polycarbonate | | 70 | 70 | 70 | 70 |
|---|---|---|---|---|---|
| ABS polymer A | | 30 | 30 | 30 | 30 |
| Stabilizer from Example 5 | | — | 0.1 | 0.25 | — |
| Stabilizer from Example 8 | | — | — | — | 0.25 |
| optical assessment after | 270° C. | 1 | 1 | 1 | 1 |
| injection moulding at | 280° C. | 1 | 1 | 1 | 1 |
| the given temperature | 290° C. | 4 | 2 | 1 | 1 |
|  | 300° C. | 6 | 4 | 3 | 3 |
| notched impact strength | 280° C. | 61 | 52 | 44 | 48 |
| kJ/m² | 300° C. | 12 | 24 | 25 | 24 |
| Melting characteristics | | 7.3 | 7.8 | 8.0 | 7.9 |
| IMI g/10 min | | 60 | 135 | 642 | 578 |
| $t_n$ min | | | | | |

We claim:

1. A stabilized thermoplastic moulding composition comprising a mixture of
    (1) from 10 to 90 parts by weight of a polycarbonate of an aromatic dihydroxy compound and
    (2) from 90 to 10 parts by weight of a mixture of
        (a) from 25 to 100 parts by weight of graft copolymer comprising styrene, methyl methacrylate or a mixture thereof as one constituent and acrylonitrile, methacrylonitrile or a mixture thereof as the other constituent polymerized on a rubber;
        (b) from 0 to 20 parts by weight of a butadiene polymer having a butadiene content of at least 5% by weight and
        (c) from 0 to 75 parts by weight of a copolymer of at least one monomer selected from the group consisting of styrene, α-methyl styrene and mixtures thereof and another monomer selected from the group consisting of methyl methacrylate, acrylonitrile, methacrylonitrile and mixtures thereof, said composition containing 0.01 to 3% by weight, based on the mixture of (1) and (2) of a phosphite of the formula

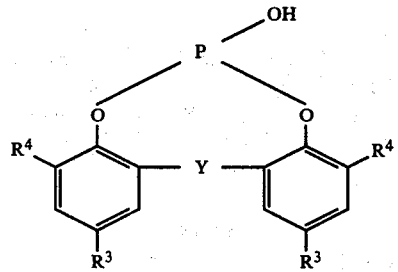

wherein $R^3$ is $C_1$-$C_9$ alkyl, $C_5$-$C_6$ cycloalkyl, $C_7$-$C_9$ aralkyl or $C_6$-$C_{10}$ aryl; $R^4$ is benzyl, methylbenzyl, dimethyl benzyl, methyl, ethyl, isopropyl, tertiary butyl, tertiary amyl, isononyl, cyclopentyl or cyclohexyl and Y is S or $HCR^5$ wherein $R^5$ is hydrogen, $C_1$-$C_6$ alkyl, cyclohexenyl or cyclohexyl.

2. The stabilized thermoplastic moulding composition of claim 1 wherein the amount of phosphite employed is 0.05 to 2.0% by weight, based on the mixture of (1) and (2).

* * * * *

UNITED STATES PATENT AND TRADEMARK OFFICE
CERTIFICATE OF CORRECTION

PATENT NO. : 4,381,359
DATED : April 26, 1981
INVENTOR(S) : Idel et al

It is certified that error appears in the above-identified patent and that said Letters Patent is hereby corrected as shown below:

Col. 2, line 45, in the formula, change "X" to --Y--;

Col. 7, line 50, change the formula to read:

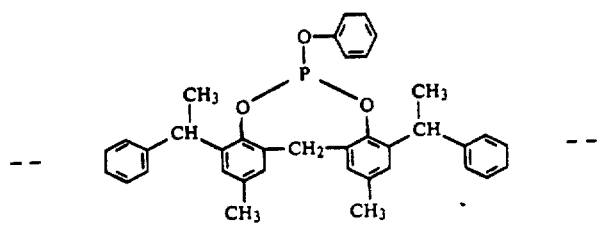

Signed and Sealed this

Sixth Day of September 1983

[SEAL]

Attest:

GERALD J. MOSSINGHOFF

Attesting Officer     Commissioner of Patents and Trademarks